Patented May 3, 1927.

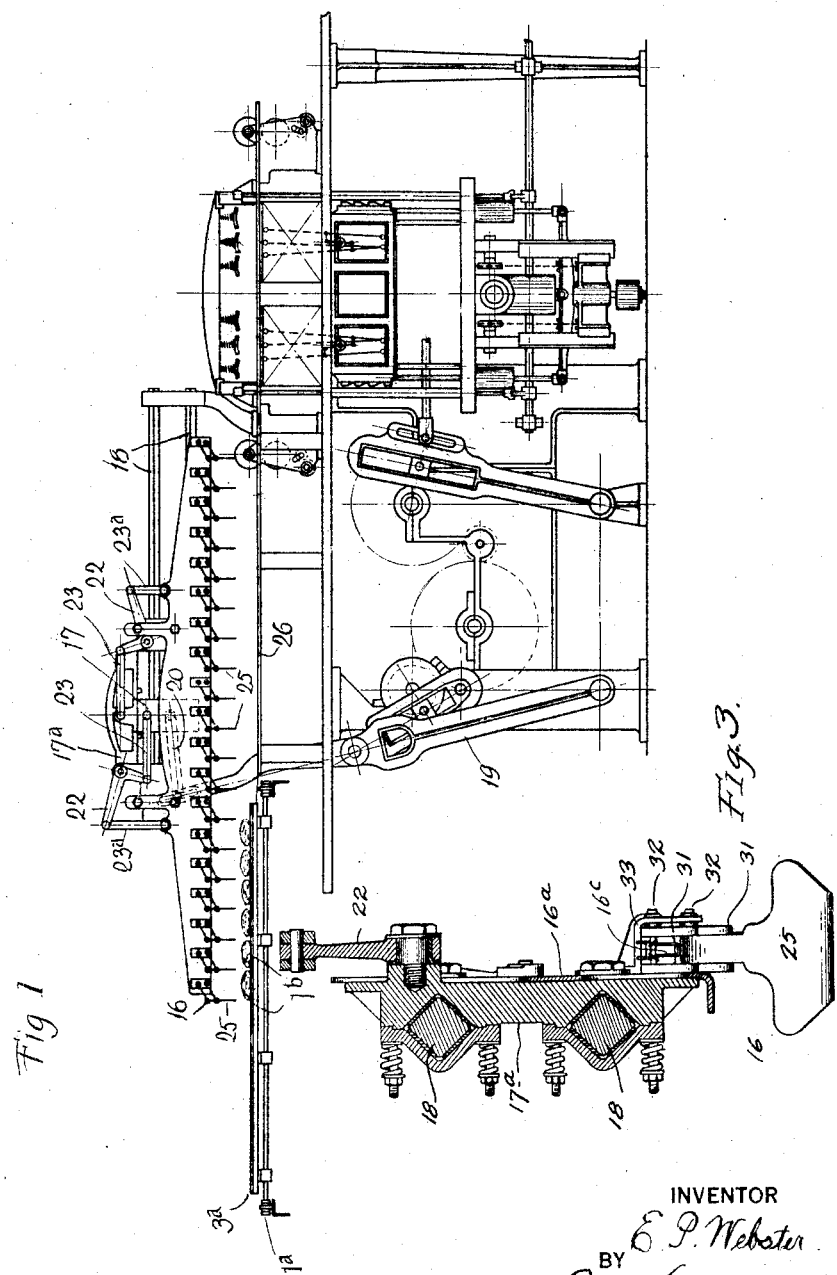

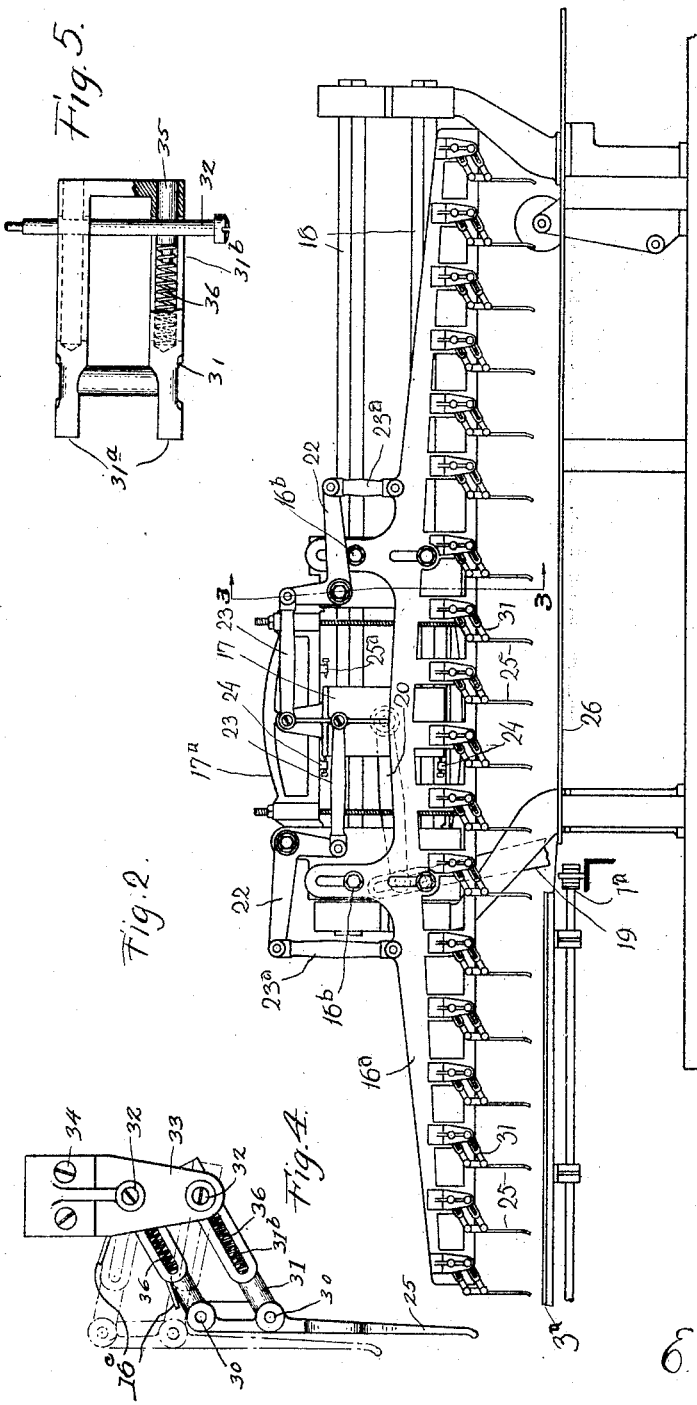

1,627,362

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

BISCUIT-REMOVAL MEANS.

Application filed June 29, 1922, Serial No. 571,825. Renewed May 11, 1926.

This invention relates to apparatus for the manufacture of food products, such as cereal biscuits, of the type in which uncooked products are placed on a conveyor, carried on the latter through an oven where they are baked, and then removed from the conveyor and delivered to the place where they are to be packed in cartons. More specifically, the present invention relates to a device for removing the products from the conveyor, and this device is of particular utility in connection with the manufacture of products of a delicate structure, such as cereal biscuits of the shredded wheat type. The application of the invention to the manufacture of such biscuits will accordingly be described, though it is understood that the utility of the invention is not limited to any particular type of product.

In one type of apparatus for the manufacture of shredded wheat biscuits there is employed a conveyor which is provided with pans on which the unbaked biscuits are deposited in a row. These biscuits are carried on the conveyor through the oven, and are there baked and dried, after which the biscuits are removed from the pans and are packed in cartons. These baked biscuits are of an extremely fragile character and must be handled with great care to avoid injury.

The object of the present invention is to provide a device by which the biscuits may be removed rapidly from the conveyor, but without injury, to a packing station, and the biscuits maintained during their removal under exact control, so that they may be delivered at the packing station in groups suitable for immediate introduction into the cartons. In one form of the device of the present invention, there is employed a reciprocating member which carries a plurality of individual biscuit-engaging members or teeth, and this member is moved in a direction transverse to the direction of movement of the conveyor. As the pans on the conveyor come successively into registry with the device, the member is moved over the pan and the teeth brought to a position in which they engage the individual biscuits in a row on the pan. Then the member is moved away from the conveyor so that the teeth carry the biscuits from the pan to a suitable receiving surface. At the end of the reciprocation the member is raised so that the teeth clear the biscuits and then is moved to its original position and the cycle of operations repeated. Preferably the number of teeth is greater than the number of biscuits removed from the pan in a single operation so that in each reciprocation of the member a group of biscuits is removed from the pan in single file and other groups of biscuits are moved along the receiving surface by the teeth. The movement of the biscuits over the surface in successive steps eventually brings the biscuits in position for delivery to the carton-filling devices.

The accompanying drawings illustrate one embodiment of the invention, and in these drawings, Fig. 1 is a side view of the device showing a portion of the conveyor and a part of the packing mechanism with which the device is intended to be used, Fig. 2 is an enlarged side view of the reciprocating members, Fig. 3 is a transverse section on the line 3—3 of Fig. 2, Fig. 4 is a side view of one of the biscuit engaging teeth showing its mounting on the parallel links.

Fig. 5 is an enlarged detail plan view of one of the parallel movement links with certain parts broken away.

Referring now to these drawings, the numeral $1^a$ designates the conveyor chain which carries transverse pans or trays $3^a$, in each of which is disposed a plurality of biscuits $1^b$, arranged in a row. In the operation of the conveyor these pans are brought successively into registry with the biscuit removal device 16.

This device includes a head 17, slidable upon guide rods 18 which extend transverse to the direction of movement of the conveyor. The head 17 includes a main head $17^a$ and a supplementary head designated 17, which receives a reciprocatory movement of greater degree than main head $17^a$. The head 17 is operated by a rock lever 19 swung on its pivot by any suitable mechanism and connected by a link connection 20 with the head.

The biscuit removal device or comb 16 has a frame $16^a$, which is provided with a slot and pin connection $16^b$ with the head $17^a$, whereby it is moved as a unit with said head horizontally, but is capable of independent reciprocatory vertical movement.

The supplementary head 17 is free to move between stops 24 and 25ª on the main head 17ª and as the rock lever 19 swings to carry the supplementary head to the left, as shown in Fig. 2, head 17 moves relatively to head 17ª until it engages the stop 24. In this movement, head 17, through links 23, operates bell crank levers 22 which are connected by links 23ª to the comb frame 16ª. This movement of the bell crank levers raises the comb frame and as soon as the head 17 engages the stop 24 of the main head 17ª, the two heads 17 and 17ª are moved as a unit, the comb frame 16 being held in its upper position. In the return movement of the heads, caused by the swinging of lever 19, the supplementary head 17 first moves relatively to head 17ª until it engages the stop 25ª and in this movement the bell crank levers are swung so as to lower the comb frame 16ª until the separate teeth 25 on the comb frame lie close to the surface of a tray 3ª on the conveyor. As the trays are brought successively into position in registry with the device, the arm 19 rocks to move the heads and the comb frame to the position illustrated in Fig. 1, and in the return movement of the lever 19 the comb is lowered, the teeth 25 entering the spaces between six biscuits of the row on the conveyor tray and as the heads are moved in unison by the lever 19, the teeth 25 move these biscuits along the tray and upon an inspection table 26.

The comb has eighteen teeth and in the first operation it moves six biscuits from the conveyor pan 3ª to the table 26. On the next operation the comb removes another group of six biscuits from the next conveyor tray to the platform and moves the first group of six along the platform. On succeeding operations of the device, six biscuits are removed from a conveyor pan and groups of biscuits on the platform or table are moved along the latter toward the automatic packing mechanism shown diagrammatically at the right in Fig. 1.

Each tooth or blade 25 of the comb 16 has pivot pins 30 connecting the same with parallel movement links 31, the latter at their inner ends having pivot pins 32, engaging brackets 33, bolted to the comb frame at 34, said pins 32 being threaded at their inner ends into the comb frame 16ª. In this way, the comb teeth or blades are capable of a vertically reciprocatory movement, as shown in dotted lines in Fig. 5 or of yielding upwardly, in case of the slightest resistance being encountered, to thereby avoid injury to the delicate biscuit, and against the tension of springs 16ᶜ, which act to return the parts to normal position.

The pins 32 pass through apertures in plugs 35 which fit in recesses in the inner ends of the links 31. In these recesses are coil springs 36 which bear against the reduced ends of the plugs 35. The pins 32 extend through open slots 31ᵇ in the opposite walls of the links and with this arrangement the comb teeth or blades are capable of a lateral yielding movement against the tension of the springs 36. The springs are relatively weak so that the teeth are capable of yielding readily to avoid injury to the delicate biscuit.

I claim:—

1. In biscuit removal means, a conveyor including transverse trays, a platform, and horizontally working means for successively removing transverse rows of biscuit in single file from said trays to said platform including an upwardly yieldable vertical pusher member for each biscuit adapted to retain its vertical position throughout its upward movement.

2. In biscuit removal means, a conveyor including transverse trays, a platform, and horizontally working means for successively removing transverse rows of biscuit in single file from said trays to said platform including an upwardly yieldable vertical pusher member for each biscuit having parallel movement carrying links and adapted to retain its vertical position throughout its upward movement and further adapted for horizontal lateral yieldable movement.

3. In biscuit removal means, a conveyor, a platform, and means for successively removing transverse rows of biscuit from said conveyor to said platform and including a head working upon guides, a frame, a rake head having vertical slot and pin connection with said frame, bell levers fulcrumed to said frame and having link connections with said head and with said rake head, said frame having stops engaged by said head in its movement upon said guides.

4. In biscuit removal means, a conveyor, a platform, and means for successively removing transverse rows of biscuit from said conveyor to said platform and including a head working upon guides, a frame, a rake head having vertical slot and pin connection with said frame, and means whereby said head in its movement will depress said rake head vertically, move the same therewith horizontally, raise the rake head vertically and move the same therewith horizontally to starting position.

5. In a biscuit removal device, a conveyor, and horizontally reciprocatory means for removing therefrom successive rows of biscuit including an individual member for each biscuit adapted for yieldable movement in different directions.

6. In a biscuit removal device, a conveyor, and horizontally reciprocatory means for removing therefrom successive rows of biscuit including an individual member for each biscuit adapted for yieldable movement upwardly, downwardly, forwardly and backwardly.

7. The combination of a conveyor adapted to carry biscuits, a member reciprocable horizontally toward and away from the conveyor, a plurality of members operatively connected to the member for engaging single biscuits in a row on the conveyor, means for reciprocating the member, and means for lowering the biscuit engaging members vertically as a unit at one point in the reciprocation of the member and for raising the members vertically as a unit at another point in the reciprocation of the member.

8. In a biscuit removal device, the combination of a member reciprocable horizontally, a second member provided with a plurality of blades, an operative connection between the first member and the second, and means for reciprocating the two members in unison, the said means permitting a relative movement of the members at the beginning of the reciprocating movement in each direction, whereby the connection between the members is operated to move the second member vertically.

9. In a biscuit removal device, the combination of a member reciprocable horizontally, a frame reciprocable horizontally and also vertically movable with reference to the said member, a connection between the member and the frame operable to raise and lower the frame, a plurality of blades carried by the frame, and means for reciprocating the member and the frame in unison, the said means permitting a movement of the member relative to the frame at the beginning of the reciprocation of the member in either direction, whereby the connection is operated to move the frame vertically.

10. In a biscuit removal device, the combination of a member reciprocable on horizontal guides, a frame reciprocable along the guides, the member and frame being capable of limited movement in the direction of their reciprocation and the frame being movable relatively to the member in a vertical direction, linkage connecting the member and the frame and being operable upon relative movement of the member and frame in the direction of their reciprocation to raise and lower the frame, a plurality of blades carried by the frame, and means for reciprocating the member and frame in unison, this means also permitting an initial relative movement of the member and frame in the direction of their reciprocation, such that the linkage is operated to raise and lower the frame.

11. In biscuit removal means, the combination of a member movable on horizontal guides, a frame reciprocable with the member horizontally and carrying a plurality of blades, this frame also being capable of vertical movement relatively to the member, linkage connecting the member and the frame and operable upon a relative horizontal movement of the frame and member to move the frame vertically, means for reciprocating the member horizontally, and means connected to the frame and engaged by the member for permitting an initial movement of the member relative to the frame to cause the latter to be moved vertically and thereafter connecting the member and frame to cause the two to be moved horizontally.

12. In a device of the class described, the combination of a horizontally reciprocating member, a frame movable horizontally by the member and capable of being moved vertically relatively thereto, and means connected to the frame and to the member and adapted to impart a lowering movement to the frame at the beginning of the reciprocation of the member in a feeding direction and to impart a raising movement to the frame upon the beginning of the return movement.

13. In a device of the type described, the combination of a reciprocating slide, a reciprocating driving member having limited movement relative to said slide, a frame carried by the slide and having vertical movement relative thereto, means operatively connecting the frame to the driving member whereby the frame is initially lowered during reciprocation in the feeding direction and initially raised during reciprocation in the reverse direction, and means carried by the frame adapted to engage behind individual articles during reciprocation in the feeding direction and to be disengaged from behind the articles during reciprocation in the reverse direction.

14. In a device of the class described, the combination of a reciprocating member and a plurality of spaced, flexibly mounted blades carried by the member, these blades being adapted to engage behind individual articles during reciprocation in the feeding direction and to be disengaged from behind the articles during reciprocation in the reverse direction.

15. In a device of the class described, the combination of a reciprocating member, a plurality of spaced flexibly mounted blades carried by the member, means for moving the member and the blades in unison in a horizontal direction, and means for moving the blades as a unit relatively to the member in a vertical direction at the beginning of the reciprocating movement in either direction.

In testimony whereof I affix my signature.

EARL P. WEBSTER.